Nov. 13, 1951 J. ADRIAN 2,574,901
PRINTERS' SAWING AND TRIMMING MACHINE
Filed March 5, 1947 3 Sheets-Sheet 1

INVENTOR,
Joseph Adrian
BY
Hull West
ATTORNEYS

INVENTOR,
Joseph Adrian
BY
ATTORNEYS

Nov. 13, 1951  J. ADRIAN  2,574,901
PRINTERS' SAWING AND TRIMMING MACHINE
Filed March 5, 1947  3 Sheets-Sheet 3

INVENTOR,
Joseph Adrian
BY
ATTORNEYS

Patented Nov. 13, 1951

2,574,901

UNITED STATES PATENT OFFICE 2,574,901

PRINTER'S SAWING AND TRIMMING MACHINE

Joseph Adrian, Cleveland, Ohio, assignor to Super Speed Printing Machinery, Inc., Cleveland, Ohio, a corporation of Ohio Application March 5, 1947, Serial No. 732,548

3 Claims. (Cl. 29—69)

This invention relates to sawing and trimming machines, especially to machines of the class used by printing establishments for the purpose of cutting and trimming type bars, slugs, borders, plates or other typographical stock.

A general object of the invention is to provide a compact sawing and trimming machine that is especially convenient of use and is characterized by its ease of adjustment to articles of different sizes and thicknesses that are to be cut.

Another and important object of the invention is to provide a self-contained sawing and trimming unit that can be used on a bench or other support, or upon a frame or stand this is made especially for the reception of said unit, the unit, in any case, being adapted to be tilted on its support for convenient access to the driving mechanism and other parts for servicing or repair.

A further object of the invention is to provide a sawing and trimming machine in which all operating parts are carried by the work table, such parts including an electric motor that is attached to the underside of the table, and an arm that carries the saw and its arbor, and which arm is pivoted to a part of the table on the axis of the motor shaft, whereby the saw may be raised and lowered with respect to the work supporting surface of the table without change of distance between the motor shaft and saw arbor, thus making especially convenient the use of a belt drive or the like between the motor shaft and saw arbor.

The feature just described, in its preferred form, involves a relatively large annular bearing element or boss that is a part of the table and surrounds the motor shaft in concentric relation thereto, and a complementary part on the arm which is frictionally engaged with said bearing element or boss; and a further object of the invention is to provide simple and effective means for holding said complementary part in frictional engagement with the element or boss The foregoing and other objects and advantages of the invention will become manifest as the specification proceeds Reference now is made to the accompanying drawings, wherein:

Figure 1:
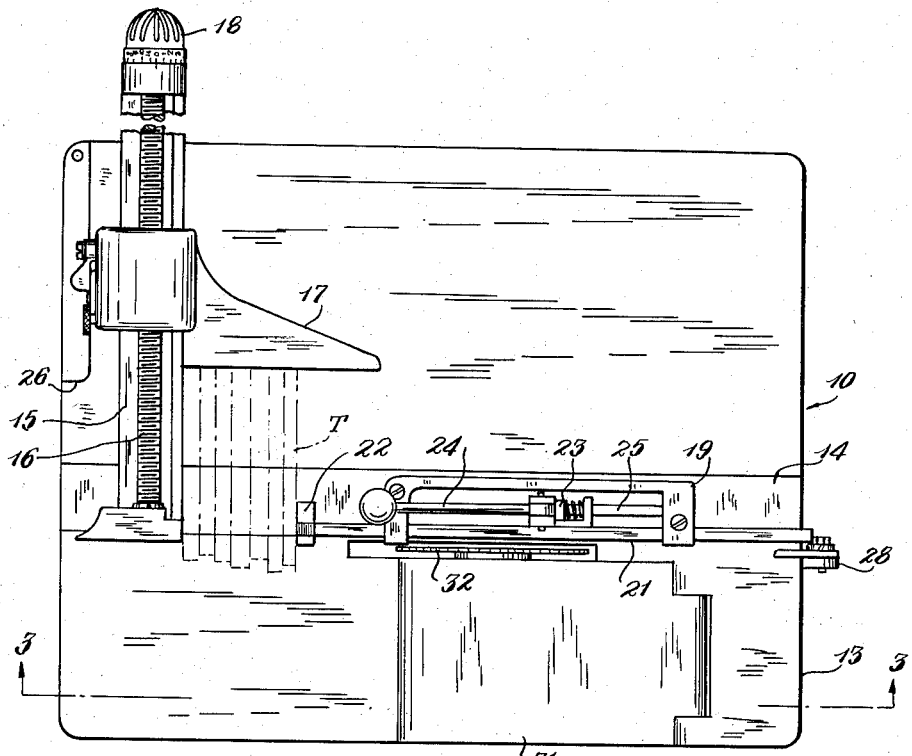
Fig. 1 is a plan of a sawing and trimming machine embodying the principles of the invention, with the saw guard broken away.
Figure 2:
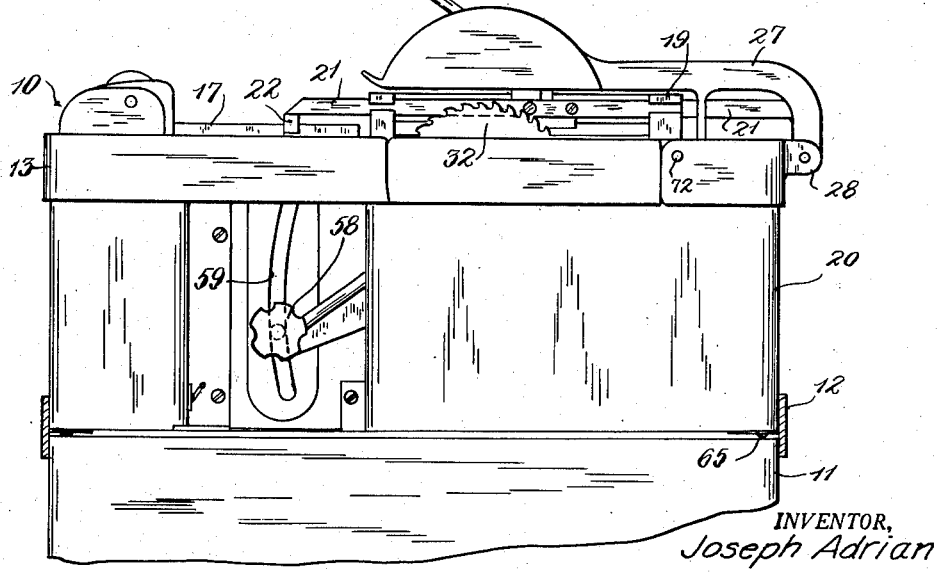
Fig. 2 is a side elevation of the machine of Fig. 1.

Referring now in detail to the drawings, a sawing and trimming machine, generally indicated by the numeral 10, is shown as supported on a frame or stand 11 that has an upwardly projecting edge strip 12 thereon to aid in retaining the machine 10 in engagement with the frame or stand. The edge strip 12 extends completely around the frame 11 but, for convenience, is shown in section in Fig. 2. A sheet metal housing 20 is normally provided for the machine 10, as shown.

The machine 10 has a flat upper surfaced work support table 13 that is made from any suitable material, such as aluminum in the form of a casting. The table 13 has a groove extending across it, and a conventional work carrying slide 14 is positioned therein. A stop or lock bar 15 is secured at one end to the slide 14 and extends normally therefrom and bears on the table. The lock bar 15 suitably journals a threaded shaft 16 thereon, and an alignment finger or member 17 is detachably engaged with the bar and shaft for quick movement therealong and for accurate final adjustment by turning the shaft. The alignment member 17 is adapted to engage the ends of the type bars, slugs or other articles to be trimmed by the machine, which articles are also aligned against or by the lock bar 15. Type bars T are shown in dotted lines as they are positioned by the bar 15 and finger 17. A control knob 18, which has a finely calibrated scale thereon, is provided at the end of the shaft 16 so as to set the alignment member 17 in an exact position with relation to the saw of the machine 10.

In order to firmly hold work against the lock bar 15, a clamp is provided, including a generally U-shaped bracket 19 that is secured to the slide 14, and a bar 21 that is slidably mounted in said bracket, the clamp being adjustable to adapt the machine for handling various amounts of material. A foot 22, which has a surface parallel to and facing the lock bar 15, is provided at one end of the bar 21 to engage the work. The clamp further comprises a locking member 23, having an actuating arm 24. Said member is secured to the rod 21 and is slidable on a guide 25 to which it is held in any adjusted position by the locking member 23. This clamp forms no part of the present invention and further description is therefore deemed unnecessary.

An extension arm 26 is shown as being pivotally secured in a rabbeted end section of the table 13, for supporting the lock bar 15 in the event of its being retracted beyond the front edge of the table to accommodate a relatively large piece of work, while the usual saw guard 27 is pivotally secured to a lug 28 adjacent the rear edge of the table. The aforesaid table extension constitutes the subject matter of my copending application Serial No. 696,400, filed September 12, 1946 and now abandoned.

Figure 3:
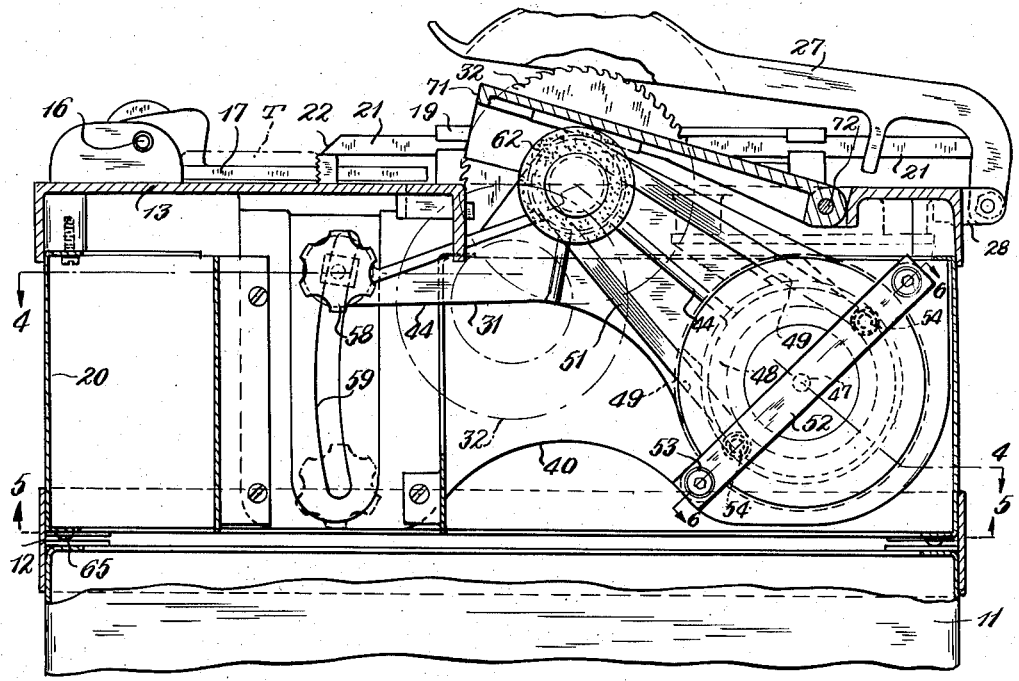
Fig. 3 is a vertical section taken on line 3—3 of Fig. 1.
Figure 4:
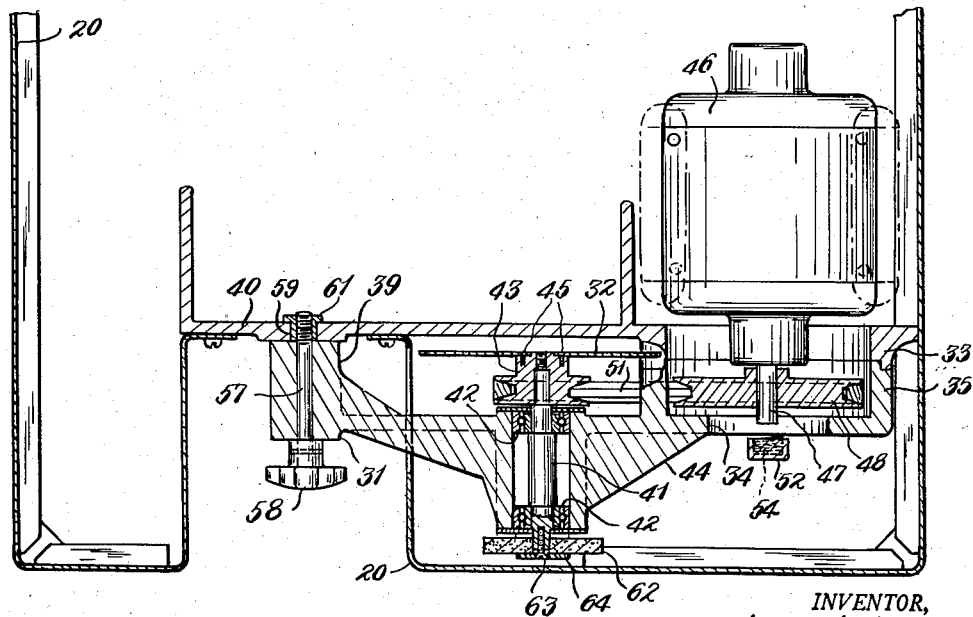
Fig. 4 is a fragmentary section on line 4—4 of Fig. 3.
Figure 6:
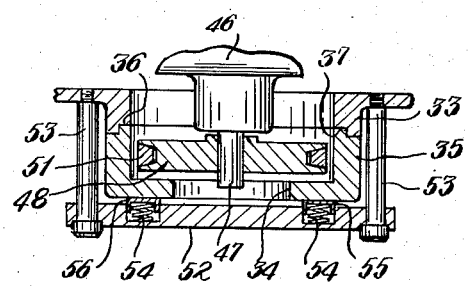
Fig. 6 is a fragmentary detail section taken on line 6—6 of Fig. 3.

The foregoing construction, with the exception of the table extension, is all known in the art, while the present invention adds to such known apparatus a support arm 31, as shown in Fig. 3, to provision a disc saw 32 in the machine 10. As an important feature of the invention, an apertured boss 33 is formed on a downwardly projecting rib 40 on the under surface of the table 13 and the arm 31 is provided with an aperture 34 in one end thereof which end has a tubular, laterally offset section 35 formed thereon encompassing the aperture 34. The offset section 35 frictionally engages the annular face of the boss, as seen in Fig. 6, and concentric positioning of the section 35 and boss 33 is accomplished by rabbeting the two in complementary relation to each other so that an annular shoulder 36 is provided on the offset section 35 to engage with an annular recess 37 in the annular face of the boss 33. The arm 31 may be made in any desired manner but preferably it is formed from a light metal, such as aluminum, by casting, and it has a reenforcing web 44 extending substantially the length thereof. In all events, the arm 31 has housing sections 38 and 39 formed, respectively, intermediate its ends, and at the end remote from the offset 35. Fig. 4 brings out that the disposition of the boss 33 is such that the arm 31 swings in a vertical plane normal to that of the work supporting table. Fig. 3 shows that the free end of the arm 31 is downwardly directed from the housing 38 to the housing 39. The housing 38 suitably journals an arbor 41 therein by means of anti-friction bearings 42, with the arbor 41 extending from both ends of the section 38. A pulley 43 is suitably secured to a projecting end of the arbor 41 which is aligned with the offset 35 of the arm 31 for a purpose to be described hereinafter, whereas the disc saw 32 is removably secured to the pulley 43 by screws 45.

In order to drive the saw 32 but permit vertical adjustment thereof with relation to the table 13 and to provide a compact, sturdy operating unit, an electric motor 46 is suitably secured to the under surface of the table 13, which motor 46 has a shaft 47 extending therefrom coincident with the axis of the boss 33. A drive pulley 48 is secured to the shaft 47 in the plane of the pulley 43. So as to connect the drive pulley 48 to the driven pulley 43 but still permit the arm 31 to be pivotally carried on the boss 33, a pair of parallel recesses, or slots 49 are formed in the tubular offset 35 of arm 31, and an endless drive belt 51, accommodated by said slots, is engaged around the pulleys 43 and 48.

Another feature of the invention is that a retainer in the form of a bar 52 (Fig. 6) is disposed across the pivoted end of the arm 31 in opposed relation to the annular face of the boss 33, and it has end portions apertured to receive cap screws 53 that are engaged with the rib 40 of the support table 13. A pair of coil springs 54 are received in cylindrical recesses 55 formed in the bar 52, and they force small cups 56 against the adjacent lateral surface of the arm 31 to seat it securely on the boss 33 and produce the desired friction between the boss and offset 35.

Vertical adjustment of the disc saw 32 is provided for and controlled by a lock shaft 57 which is journalled in the housing section 39 and carries a knob 58 at its outer end. The shaft 57 projects through a slot 59 formed in the rib 40 and exposed by a cutout portion of the sheet metal housing 20. A flanged nut 61 is slidable but non-rotatable in the slot 59 and threadedly engaged with this nut is the inner end of the shaft 57 so that by turning the knob 58 the free end of the arm 31 may be locked in any desired position to the rib 40. By this means the disc saw is readily adjustable for action on any size of articles within the capacity of the machine.

A small abrasive wheel 62 may be secured to the outer projecting end of the arbor 41 by a screw 63 that has a washer 64 associated therewith. This is in accordance with common practice, and said abrasive wheel may be used for sharpening the saw and for other and more general purposes.

Figure 5:
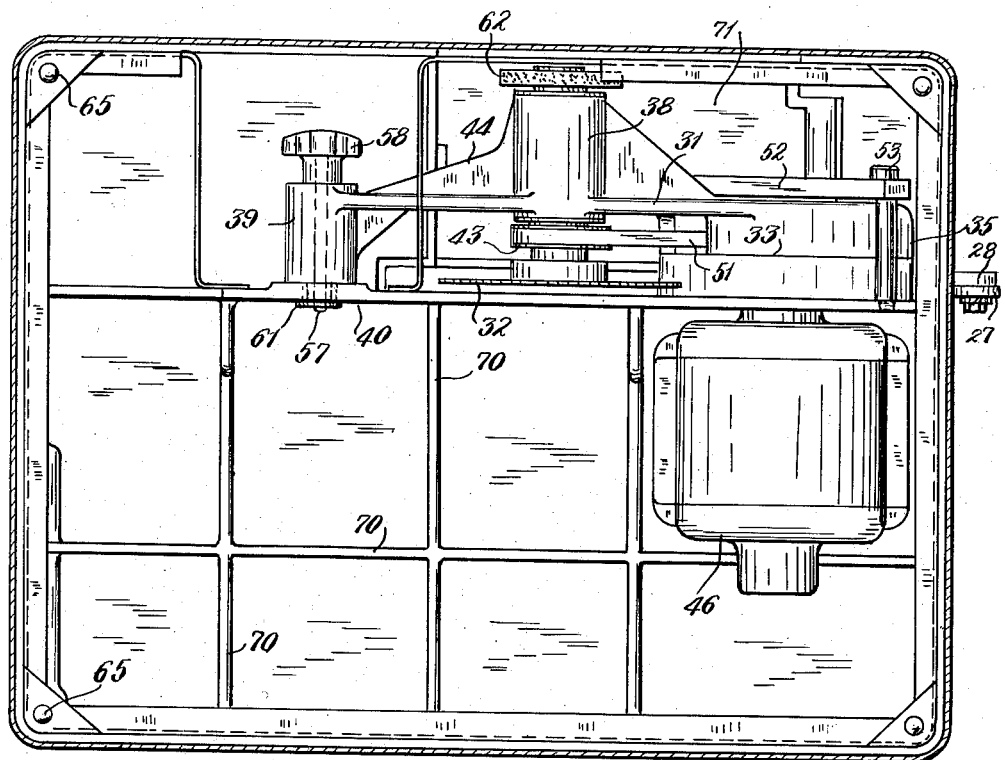
Fig. 5 is a bottom plan of the machine taken on line 5—5 of Fig. 3.

Fig 5 clearly shows that the machine 10 is provided with feet 65 on which it is supported. The machine 10 is adapted to be lifted easily from or tilted on its support when it is to be serviced or repaired.

Reenforcing ribs 70 are provided on the under surface of the support table 13, as shown. A substantially rectangular section 71 of the table 13, adjacent the saw accommodating slot 28, and remote from the work carrying area of the table, is hinged to an adjacent part of the table by a pintle 72. Thus, when the saw 32 is moved to its upper positions, the housing section 38 of the arm 31 will bear against the table section 71 and swing it upwardly.

From the foregoing, it is seen that my invention provides a compact and readily adjustable sawing and trimming machine that is very convenient of use and the servicing and repair of which are facilitated by its self-contained and tiltable features.

One complete embodiment of the invention has been illustrated and described in detail herein but the invention is not limited to the specific example set forth since modification may be resorted to within the scope of the appended claims; and where the term "belt" appears, it is to be understood as embracing any equivalent flexible driving element.

What is claimed is:

1. In combination, a structure characterized by a substantially horizontal work support table, a motor supported by and beneath the table with its shaft substantially parallel thereto, the structure including a vertical wall depending from the work support table, said wall having an annular bearing part surrounding the motor shaft in concentric relation thereto but separated therefrom by a vacant annular space, a support arm having an annular bearing part mating with said bearing part of the wall to pivotally mount the arm independently of said shaft, means yieldingly acting in a direction axially of the shaft maintaining said bearing parts in operative relation to each other, an arbor journaled in said arm remote from said shaft, driving connections between the shaft and arbor, a disc saw secured to the arbor, and holding means for securing said support arm in any of a plurality of positions to vary the relationship between the saw and work support surface.

2. The combination defined by claim 1, wherein said bearing parts have faces that engage in a plane normal to the pivotal axis of the support arm and are characterized by annular interengaging portions for holding them against relative shifting in a radial direction, and the means for yieldingly maintaining said parts in operative relation consists of a bar disposed across the support arm substantially diametrically of the annular bearing part thereof, the motor shaft stopping short of the side of the arm remote from said wall, tie members connecting said bar to the wall, and compression means between the bar and arm acting to press the bearing part of the arm against the bearing part of the structure.

3. The combination defined by claim 1, wherein said bearing parts have faces in the form of reversely rabbeted annular surfaces that interfit one within the other, and the means for yieldingly maintaining said parts in operative relation consists of a bar disposed across the support arm substantially diametrically of the annular bearing part thereof, the motor shaft stopping short of the side of the arm remote from said wall, tie bolts connecting the ends of the bar to the wall, and compression springs interposed between the bar and support arm.

JOSEPH ADRIAN.

REFERENCES CITED

The following references are of record in the file of this patent:

UNITED STATES PATENTS

| Number | Name | Date |
| --- | --- | --- |
| 365,918 | Greene | July 5, 1887 |
| 1,097,993 | Sherman | May 26, 1914 |
| 1,198,797 | Waterman | Sept. 19, 1916 |
| 1,408,831 | Runnels | Mar. 7, 1922 |
| 1,427,297 | Johnson | Aug. 29, 1922 |
| 1,940,178 | Mohr | Dec. 19, 1933 |
| 2,109,057 | Billker et al. | Feb. 22, 1938 |
| 2,165,953 | Bilker et al. | July 11, 1939 |
| 2,496,716 | Hanna | Feb. 7, 1950 |